United States Patent [19]
Isfeld

[11] Patent Number: 5,664,166
[45] Date of Patent: Sep. 2, 1997

[54] SYSTEM FOR GENERATING A VARIABLE SIGNAL IN RESPONSE TO A TOGGLE SIGNAL SELECTIVELY DELAYED USING A CLOCK EDGE AND TIME DELAY MEASURED FROM THE CLOCK EDGE

[75] Inventor: Mark S. Isfeld, San Jose, Calif.

[73] Assignee: 3Com Corporation, Santa Clara, Calif.

[21] Appl. No.: 438,882

[22] Filed: May 10, 1995

[51] Int. Cl.$^6$ .................................. G06F 1/04; G06F 1/12
[52] U.S. Cl. ......................... 395/556; 395/551; 395/552
[58] Field of Search ................................. 395/551, 552, 395/556; 327/24, 31, 166, 172, 173, 174

[56] References Cited

U.S. PATENT DOCUMENTS

| | | | |
|---|---|---|---|
| 4,099,072 | 7/1978 | Lee et al. | 327/177 |
| 4,675,546 | 6/1987 | Shaw | 327/176 |
| 5,179,693 | 1/1993 | Kitamura et al. | 395/550 |
| 5,298,799 | 3/1994 | Cochran et al. | 327/227 |

*Primary Examiner*—Thomas C. Lee
*Assistant Examiner*—Rehana Perveen Kriek

[57] ABSTRACT

A digital circuit for generating a signal with a pulse width that is other than a half multiple of the clock is shown. The signal width can be greater or less than the clock period. This digital circuit includes a signal modifier, responsive to the clock signal, for generating a signal with a logic 0 state in response to the first clock edge and a signal with a logic 1 state in response to a toggle signal. A delay circuit generates the toggle signal in response to the second clock edge and a time delay measured from the second clock edge. With the appropriate delay element in the delay circuit, the generating of the toggle signal can be selectively delayed to extend the duration of the pulse.

22 Claims, 5 Drawing Sheets

SYSTEM FOR GENERATING A VARIABLE SIGNAL IN RESPONSE TO A TOGGLE SIGNAL SELECTIVELY DELAYED USING A CLOCK EDGE AND TIME DELAY MEASURED FROM THE CLOCK EDGE

BACKGROUND OF THE INVENTION

1. Field of the Invention

The present invention relates to digital circuits; and more particularly, to a pulse width modifying digital circuit generated by a digital state machine.

2. Description of Related Art

Many applications will show an improvement in performance or allow a more straightforward and cost-effective implementation if certain pulse signals with selectively variable pulse widths are employed. These pulse widths should deviate from the standard clock pulse width, as desired. However, Applicant is not aware of any such feasible circuit design. As a result, designers either focus on improving other aspects of these applications to improve performance or tolerate existing problems.

One such application is Row Access Strobe (RAS) and Column Access Strobe (CAS) generation in Dynamic Random Access Memory (DRAM) systems. This system requires a pulse that is slightly longer than the time between any two adjacent edges of the clock signal. In particular, transferring data to and from a Page Mode DRAM every 40 nanosecond (ns) is possible, but typically, devices require a CAS signal with a 25 ns active time and a 15 ns inactive time. Using a digital clock signal with a 40 ns period, a circuit that generates a 20 ns active time and a 20 ns inactive time is readily realizable. However, a circuit that generates a 25 ns/15 ns signal is not known or available using strictly digital integrated circuit technology.

One approach to satisfying device requirements of a 25 ns active time and 15 ns inactive time CAS signal is to generate a 25 ns/25 ns signal. However, this signal limits the data transfer speed to 50 ns per data item transfer, which is much slower than the 40 ns which the device will support. Another approach is to utilize an analog-based off-chip discrete tuned delay line, such as an inductor-capacitor tuned resonant circuit. These analog-based tuned circuits are not readily implementable on the same IC gate array chip and generally adds cost to the design. In addition, using analog components is not very stable or reliable for generating short delays, such as 25 ns; analog components are susceptible to temperature and voltage variances. Thus, an analog circuit designed to provide 25 ns may actually provide a wide range of delays, from 15 to 40 ns. Furthermore, some analog designs increase signal skew in the process of stretching the pulse width from 20 to 25 ns. Still other approaches provide internal pulse generators that provide a pulse that is smaller than the clock period. But this approach adds complexity to the design.

Another application that benefits from a variable pulse width generating digital circuit is a tri-state output enable signal generation circuit for use with high speed buses. High speed buses having lines which allow multiple users to drive the line can be termed bi-directional. Several problems are encountered when standard tri-statable CMOS drivers are used to drive bi-directional lines on such buses. One significant problem is caused by imperfect synchronization of the multiple drivers attached to the bus. If there is any overlap between the time one driver is turned off and another driver is turned on, there may be a very large current running between them. The effect of this contention for control of the state of the bus line is described with reference to FIG. 2 below.

The typical method used to eliminate the current spike is to put an off cycle between the times when the signals are driven by different drivers. Unfortunately, this method results in lost cycles. Lost cycles can be particularly painful when there are a lot of small burst transfers from random channels on the bus.

Another way in which the current spike can be reduced is by going with open drain outputs which are tied together and attached to a pull up resistor. In this situation, there is less problem with a change in current since the current is about the same whether one device or two devices are driving the line. The downside of this method is that the only way for a signal to rise is through the pull up resistor. This creates a troublesome tradeoff for high speed buses. That is, small resistors are required to achieve fast rise times. However, small resistors result in an increase in DC current.

Accordingly, it is desirable to provide a high speed, tri-state bus having bi-directional lines which do not suffer the cycle time delay or high current device contention of prior art designs during bus reversal. Additionally, a digital circuit that generates a pulse with a variable pulse width is particularly desirable for DRAM systems employing RAS/CAS signals. CAS signals generated by a digital state machine and providing a non-constant, or variable, pulse width signal is particularly advantageous for those devices with specific CAS signal requirements for data transfer. In sum, a need exists in the industry for a circuit that provides a variabte pulse width signal that can be generated by a digital state machine which is cost-effective and relatively simple in implementation.

SUMMARY OF THE INVENTION

The present invention provides an improvement in performance of high speed tri-state buses and CAS signal generation in DRAM systems. A digital circuit for generating a signal which extends the second, or mid-phase, edge of the clock signal is shown. The signal width is other than a multiple of a half of the clock period and has a transition to the second signal state between any two clock edges. Hence, the transition from the first signal state to the second signal state can occur between the second clock edge and the first clock edge of the next clock period. Alternatively, the transition can occur some time at a later clock period so long as the transition does not occur at a half multiple of the clock period. Thus, the first edge of the signal at the first signal state is triggered by the first clock edge and the digital circuit includes a signal modifier, responsive to the clock signal, for generating a signal with a logic 0 state in response to the first clock edge and a signal with a logic 1 state in response to a toggle signal. A delay circuit generates the toggle signal in response to the second clock edge and a time delay measured from the second clock edge. The time delay can be variable and predefined by the user.

One aspect of the invention includes a signal generating digital circuit, where the circuit receives a clock signal having a clock period. The clock signal has a first clock edge and a second clock edge. The circuit includes a signal modifier and a delay means. The signal modifier is responsive to the clock signal for generating a signal having a first signal state, such as logic 0, and a second signal state, such as logic 1. The signal at either the logic 0 or logic 1 state is generated in response to and synchronized with the first clock edge and the signal transitions between the logic 0 and the logic 1 in response to a toggle signal.

The circuit also includes a delay means, responsive to the clock signal, for generating the toggle signal in response for a time delay. Prior to the signal transition, the duration of the signal at, for example, logic 0 state, is other than a multiple of a half of the clock period and occurs between any two clock edges. Preferably, the duration is greater than the time measured between the first clock edge and the second clock edge. Alternatively, the duration can last beyond a single clock period. In one embodiment, the delay means generates the toggle signal in response to and synchronized with the second clock edge and the time delay is measured from the second clock edge.

The signal modifier includes a first enable means, a second enable means, and means for generating the signal. The first enable means receives the clock signal and a first reset signal. The first reset signal has a first enabled state and a first disabled state. The first enable state generates a first intermediate signal at either the first signal state or the second signal state when the first reset signal is in the first disabled state.

The second enable means receives the clock signal and a second reset signal. The second reset signal has a second enabled state and a second disabled state. The second enable means generates a second intermediate signal having either the first signal state or the second signal state when the second reset signal is in the second disabled state. In some embodiments, the toggle signal controls the first reset signal and the second reset signal to enable and disable the first enable means and the second enable means. Usually, the toggle signal includes a transition between a first toggle state and a second toggle state. Thus, only transitions of the toggle signal controls the first reset signal and the second reset signal.

The means for generating the signal is responsive to the first intermediate signal and the second intermediate signal. In one embodiment, this means is a logic NOR gate.

In a particular embodiment, the first enable means includes a first D flip-flop and a first NOR gate. The first D flip-flop includes a first data input for receiving a data valid signal, a first clock input for receiving the clock signal, a first reset input for receiving the first reset signal, and a first D output for generating the first intermediate signal. The first NOR gate includes a plurality of inputs for receiving a test reset signal and the toggle signal, and a first NOR output for supplying the first reset signal to the first reset input of the first D flip-flop.

Likewise, the second enable means includes a second D flip-flop and a second NOR gate. The second D flip-flop includes a second data input for receiving the data valid signal, a second clock input for receiving the clock signal, a second reset input for receiving the second reset signal, and a second output for generating the second intermediate signal. The second NOR gate includes a plurality of inputs for receiving a test reset signal and the toggle signal, and a second NOR output for supplying the second reset signal to the second reset input of the second D flip-flop.

The delay means includes a third NOR gate, a delay buffer, and a third D flip-flop. The third NOR gate receives the second reset signal and the signal for generating a toggle control signal. The delay buffer receives the clock signal for supplying a toggle clock signal. The third D flip-flop receives the toggle control signal and the toggle clock signal for supplying the toggle signal to the first enable means and the second enable means.

The present invention can also be characterized as a column access strobe (CAS) generating circuit for a dynamic random access memory (DRAM) system in a computing environment for generating a CAS signal, where the circuit receives a clock signal with a first clock edge and a second clock edge, and the clock signal has a clock period. The structures and functions are as described above.

The present invention can also be characterized as a method of generating a signal in response to a clock signal with a first clock edge and a second clock edge, where the clock signal has a clock period. The steps in the method include (1) forming a signal at a first signal state in response to and synchronized with the first clock edge of the clock signal; (2) forming a toggle signal in response to a time delay; and (3) forming a transition of the signal from the first signal state to a second signal state in response to the toggle signal, where the first signal state has a duration that is other than a multiple of a half of the clock period and the transition occurs between any two clock edges.

The step of forming the toggle signal includes forming the toggle signal in response to and synchronized with the second clock edge and the time delay, where the toggle signal includes a transition between a first toggle state and a second toggle state. The step of forming the signal with the first signal state includes (1) forming a first reset signal, the first reset signal having an enabled state and a disabled state; and (2) forming a first intermediate signal having one of the first signal state and the second signal state when the first reset signal is in the disabled state to trigger the formation of the signal. The step of forming the signal with the second signal state includes (1) forming a second reset signal having an enabled state and a disabled state; and (2) forming a second intermediate signal having one of the first signal state and the second signal state when the second reset signal is in the disabled state to trigger the formation of the signal.

Other aspects and advantages of the present invention can, be seen upon review of the figures, the detailed description, and the claims which follow.

DETAILED DESCRIPTION OF PREFERRED EMBODIMENTS

Figure 1:
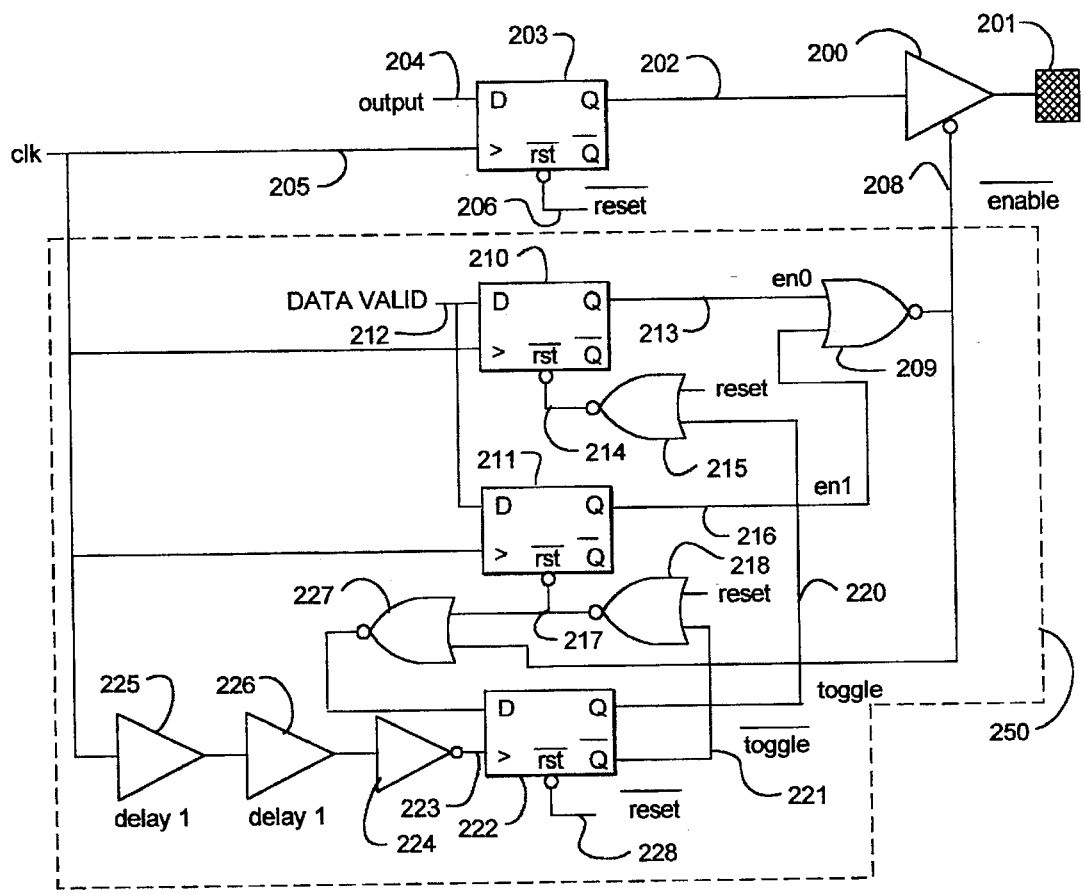
FIG. 1 shows an embodiment of the present invention incorporated in an output enable generation circuit for input to the tri-state driver for the system of FIG. 3.
Figure 3:
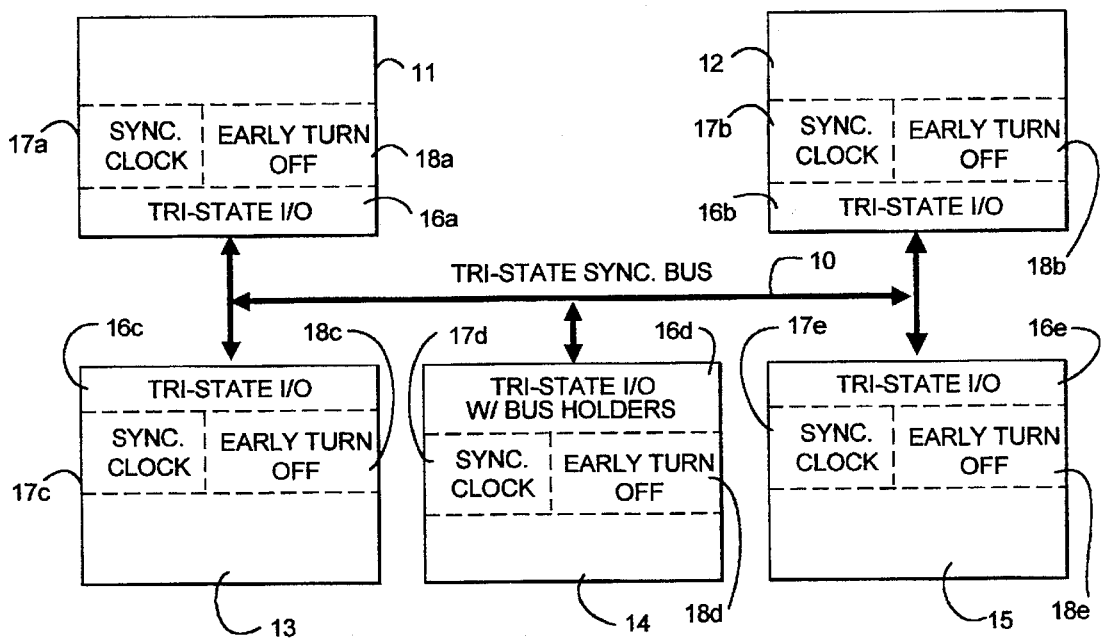
FIG. 3 is a schematic block diagram of a tri-state synchronous bus system implementing the present invention.
Figure 10:
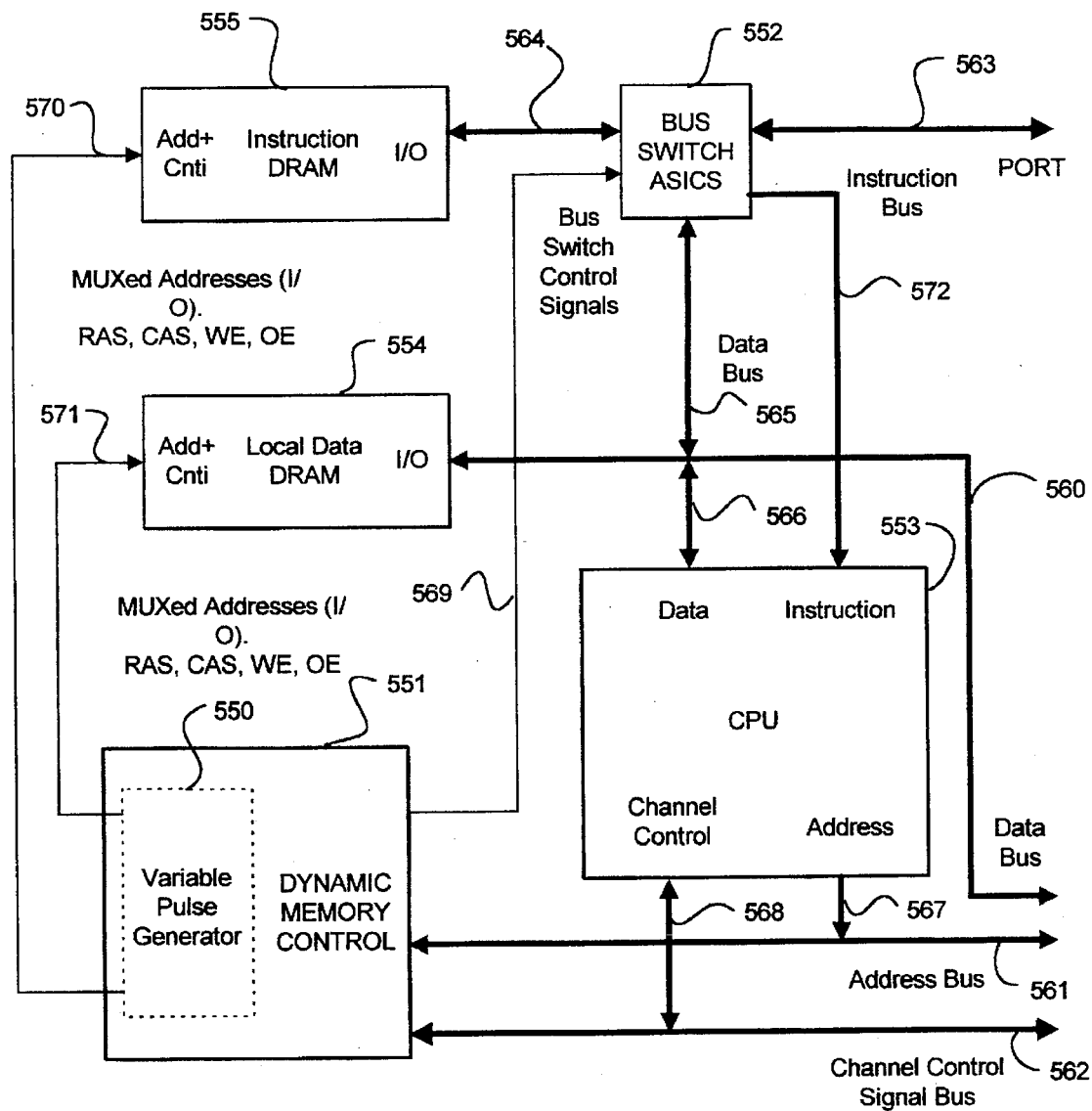
FIG. 10 illustrates the DRAM environment in which the variable pulse width signal generator of the present invention is employed for generating the CAS signal.

A detailed description of the embodiments of the present invention is provided with reference to the Figures, in which FIG. 1 provides a circuit diagram of one embodiment of the invention, identified by reference numeral 250. The output signal of circuit 250 is a signal with a variable pulse width, where the pulse width is typically greater than the width of the clock signal measured from the first clock edge to the second clock edge (mid-phase point). The present invention can be utilized in a tri-state synchronous bus system for generating the output enable signal and in a DRAM environment for generating the CAS signal. FIG. 3 provides a system block diagram based on a tri-state synchronous bus and FIG. 10 shows a DRAM system environment.

FIG. 1 shows one embodiment of the present invention utilized in a bus driver circuitry for generating the output enable signal. This embodiment shows the enable circuitry for generating the early enable turn off. This digital circuit of the present invention is represented by the dotted line and designated by the reference numeral 250. The inputs to this circuit are the clock signal and the data valid signal. The output is enable. In other embodiments, the output is the CAS or CAS signal.

Thus, the system includes a bus driver circuit 200 which is connected to a bi-directional bus line 201. Line 201 would also be connected to an input buffer, with or without a bus holder circuit, depending on the particular implementation.

The tri-state buffer 200 is driven by a synchronous data signal on line 202 at the output of a register 203. The register 203 receives data output on line 204 from a host device using the bus. The data output on line 204 is latched in the register 203 in response to the bus clock on line 205. A reset signal active low is provided on line 206 in this example. Thus, the register 203 provides for issuing synchronized data to the buffer 200 for supply on the bus line 201.

The buffer 200 is a tri-state buffer having a first state which presents a high impedance to the bus line 201, and second and third states which correspond to the binary logic values of the data on line 202, in which the bus line 201 is driven with a high or low voltage.

The enable signal for the driver 200 is supplied on line 208 at the output of NOR gate 209. The inputs to NOR gate 209 are first and second valid signals en0 and en1 produced using first and second registers 210 and 211, respectively. The register 210 receives a data valid signal on line 212 at its data input, and the bus clock on line 205 at its clock input. The output of register 210 is a first valid signal en0 on line 213. A first reset signal is supplied on line 214 at the output of NOR gate 215 to an active low reset input on the first register 210. The second register 211 is similarly connected, having the data valid signal connected to its data input, the bus clock connected to its clock input, and its output supplied on line 216 as a second valid signal en1. A second reset signal on line 217 is supplied at the output of NOR gate 218 and is connected to an active low reset input on the second register 211. The reset inputs to NOR gates 215 and 218 are normally at logic 0, unless testing is desired. The first and second valid signals, en0 and en1, respectively, are the first and second intermediate signals necessary for generating the output signal.

The first and second reset signals are generated in response to respective toggle signals on lines 220 and 221 which are produced using register 222. The register 222 is clocked by the signal on line 223 at the output of inverter 224. The input of inverter 224 is a delayed version of the bus clock from line 205. Thus, a first delay 225 and a second delay 226 are coupled between the bus clock on line 205 and the input of inverter 224. These delay elements 225, 226 contribute to the duration or width of the signal pulse.

The data input for register 222 is supplied at the output of NOR gate 227. The inputs to NOR gate 227 include the second reset signal from line 217 which is coupled to the second register 211 and the enable signal on line 208. Also, a reset signal is supplied on line 228 to the register 222. The Q output of register 222 is supplied as the toggle signal on line 220, and the $\overline{Q}$ output is supplied as the toggle output on line 221.

Figure 2:
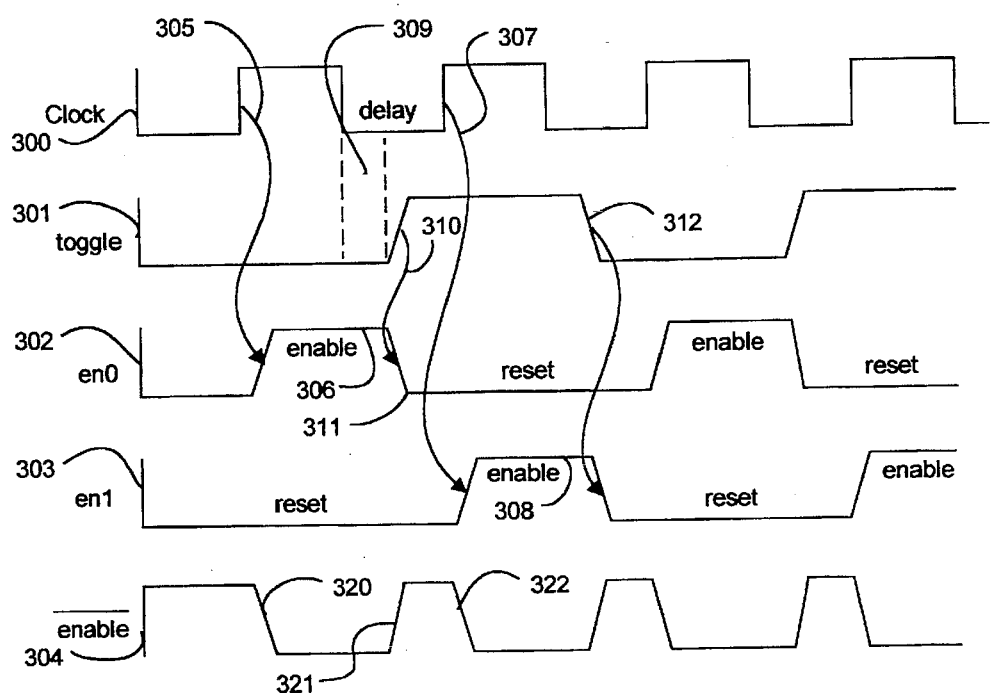
FIG. 2 is a timing diagram illustrating the operation of the enable circuitry of FIG. 1.

FIG. 2 illustrates the timing of the various signals for generating the signal with the variable pulse width in accordance with the present invention. In the context of the output enable circuitry for the bus driver of FIG. 1, FIG. 2 illustrates the operation of the enable circuitry to generate the early enable turn off. Thus, FIG. 2 shows the bus clock at trace 300, the toggle signal from line 220 on trace 301, the first valid, or intermediate, signal en0 on trace 302, the second valid, or intermediate, signal en1 on trace 303, and the active low enable signal from line 208 on trace 304. In general, the output signal of trace 304 represents the output signal of the present invention that provides a variable pulse width synchronized with the clock edges of the clock signal (shown on trace 300).

The toggle signal on line 221 is the inverse of trace 301 and not shown. If at the first rising edge of the clock at point 305 the data valid signal on line 212 is high, then the first valid signal en0 will turn on during interval 306. Similarly, at the next rising edge of the bus clock at point 307, the second valid signal en1 will turn on during interval 308. The toggle register 222 will have a high signal at its data input in response to a low signal on line 208. Thus, the falling edge of the bus clock delayed by the interval, shown generally at 309, will cause the second data valid en1 at the output on line 220 of the register 222 shown at trace 301 to go high at point 310. This causes the first register 210 to be reset, turning off the first valid signal en0 on trace 302 at point 311. On the rising edge of the next bus clock at point 307, the second data value en1 at the output of the register 211 goes high because the toggle signal on line 221 is the inverse of that shown on trace 301. On the falling edge of the next succeeding clock and after the delay caused by the delay elements 225 and 226 at point 312, the toggle signal falls, resetting the output of register 211, shown at trace 303. On the next rising edge, the output of register 210 goes high and so on. This results in generation of the active low enable signal as shown at trace 304 at the output of the NOR gate 209.

Hence, in this embodiment, the transitions of the toggle signal, shown as points 310 and 312 on trace 301, determine the pulse width of the output signal. The initial clock edge of the clock signal, such as point 305 on trace 300, triggers the beginning of the output signal and the transition of the toggle signal, such as point 310 of trace 301, triggers the end of the pulse width. The next pulse is triggered by the next clock edge of the clock signal.

Thus, in accordance with the present invention, a variable pulse width signal can be generated. Signal splits of 25 ns active state and 15 ns inactive state for a clock period of 40 ns is readily obtainable. Other splits are possible. If the clock period is decreased to 35 ns, pulse splits of 22 ns active and 13 ns inactive are possible. Alternatively, other signal splits are possible including signal pulse widths that are greater than a clock period. With the delay elements 225, 226 (see FIG. 1), signal transition can occur between any two clock edges. The duration of the signal at the first signal state (such as the signal between transitions 320 and 321 of FIG. 2) is variable and in one embodiment, the duration is other than a multiple of a half clock period.

As can be seen, the enable signal turns on at a first particular phase state of the bus clock at transition 320. It turns off at a second particular phase state of the bus clock at transition 321 which is prior to the first particular phase state 322 for the next cycle. Alternately, transition 321 can occur at any time beyond that clock period, especially durations that are non-half multiples of the clock period. Thus, the low enable signal is driven during 60% or 70%, and as much as 99% of the data transfer period, of the bus clock, and turned off for the balance of the bus clock. The bus holder circuit then takes over the bus line, holding it at the driven value, until the next driver takes over.

As can be seen in FIG. 3, a tri-state synchronous bus 10 is provided which is coupled to a plurality of users of the bus, including a first user 11, a second user 12, a third user 13, a fourth user 14, and a fifth user 15. Each of the users includes a plurality of tri-state I/O drivers, generally 16a through 16e. Further, each of the users 11 through 15 includes a synchronous clock generator or other circuitry, generally 17a through 17e, respectively, for producing a bus clock. According to the present invention, an early enable turn off circuitry, generally 18a through 18e, is included in each device. At least one of the users, such as user 14, includes bus holder circuits coupled to each bi-directional line on the tri-state synchronous bus. Only the bi-directional drivers on the tri-state bus system suffer the problem addressed by the present invention. Thus, the address and data lines, the read-write control lines, and other control lines which may be driven by multiple users of the bus include the early enable turn off feature of the present invention.

Figure 4:
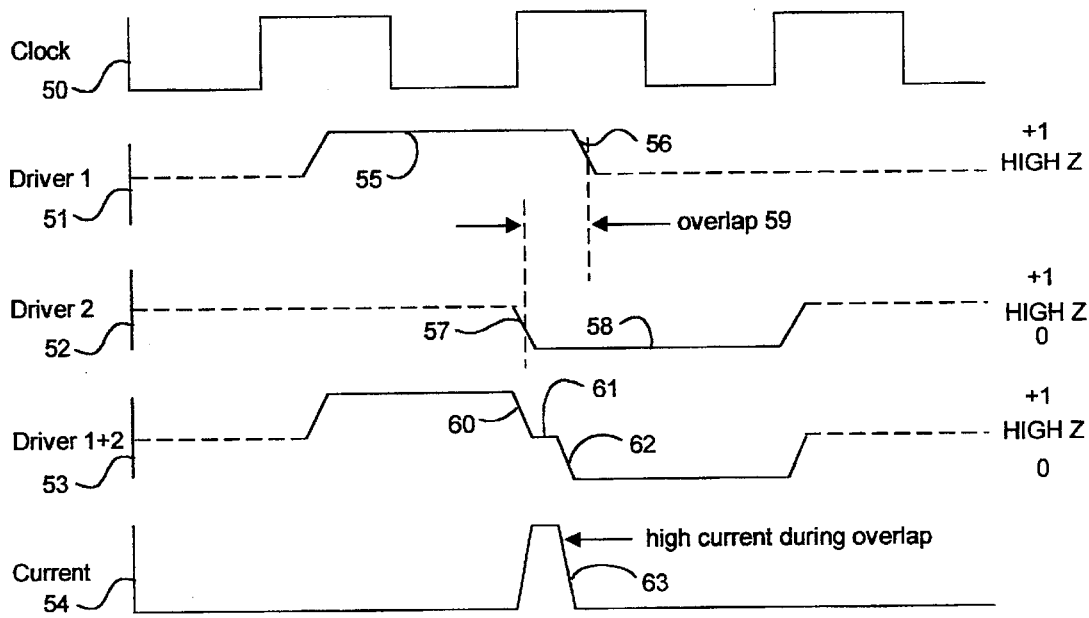
FIG. 4 is a timing diagram illustrating the problems with prior art bus drivers.
Figure 5:
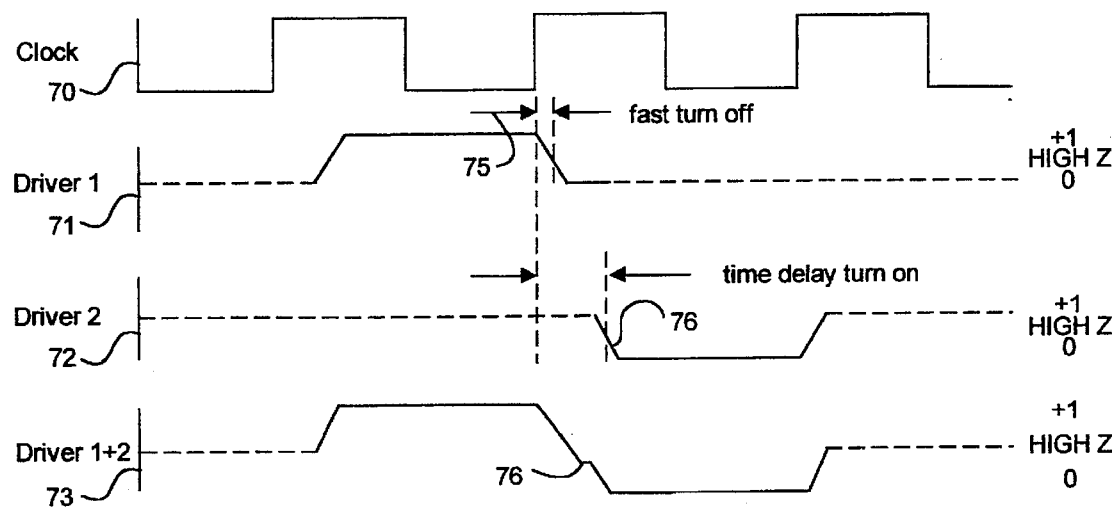
FIG. 5 is a timing diagram illustrating one approach to tri-state bus reversal.
Figure 6:
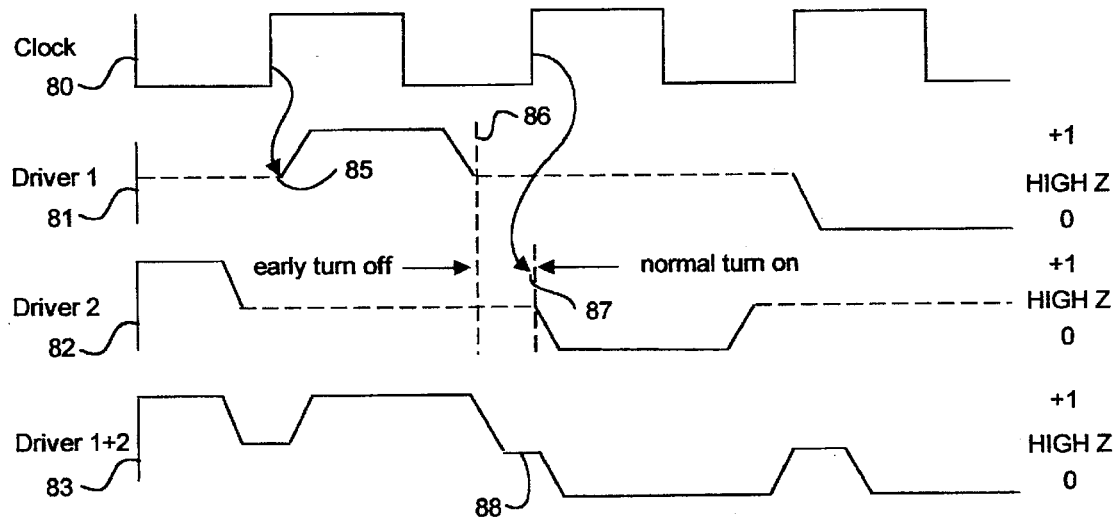
FIG. 6 is a timing diagram illustrating the preferred approach to implementing bus reversal according to the present invention.

The problem solved by the system of FIG. 3 can be understood with reference to FIGS. 4 through 6. In FIG. 4 a problem presented by the prior art is illustrated. For a system not using the present invention, FIG. 4 illustrates a bus clock at trace 50, the output of a first driver on trace 51, the output of a second driver on trace 52, the sum of the outputs of drivers 1 and 2 on trace 53, and the current on the bi-directional line to which the drivers are connected at trace 54. As can be seen, driver 1 is supplying a high voltage during interval 55, and is turned to a high impedance state at time 56. The second driver is in a high impedance state during the initial part of the trace, and is turned on at point 57 to supply a low voltage during the interval 58. This causes an overlap, generally 59, between the outputs of the first and second drivers. As a result of the overlap 59, the voltage on the bus assumes the shape shown at trace 53, going high during interval 55, until the bus driver on trace 52 turns on to the low voltage. This lowers the potential, as shown at segment 60 of trace 53, until the time when both driver 1 and driver 2 are contending for the bus with high and low voltages, respectively, during the segment 61. After the first driver turns off in segment 62, the voltage driven by the second driver is reached on the bus during the interval 58.

When the first and second drivers are opposing one another during the interval 61, a high current spike 63 occurs on the bus as shown at trace 54. Because two drivers on the synchronous bus cannot be perfectly synchronized, it is likely that overlaps will occur when the bus reverses direction. These overlaps create high current spikes which may cause reliability problems, increased noise on power supplies (on and off chip), increased radiated and conducted electrical emissions, overheating, and the like.

FIG. 5 provides a timing diagram for one technique for avoiding the overlapping signals, showing the bus clock at trace 70, the voltage of a first driver at trace 71, the voltage of a second driver at trace 72, and the sum of the first and second drivers on trace 73. As can be seen, according to FIG. 5 the drivers are implemented such that there is a fast turn off time synchronized closely with the rising edge of the clock at point 75. Also, a delayed turn on at point 76 for the second driver is implemented to prevent any overlap. Thus, the first driver is allowed to settle to the high impedance state, e.g. at point 76 on trace 73, before the second driver takes over the bi-directional line. This delayed enable turn on approach allows the use of CMOS drivers without a lost cycle during bus reversal, having lower noise than the standard CMOS drivers and lower DC current than the open drain configuration. Although probably suitable for some applications, this approach erodes signal set up time or transmission time on the bus and therefore may limit bus operation frequency, or makes device timing difficult to achieve.

The preferred early enable turn off solution is illustrated in FIG. 6. In FIG. 6, the bus clock is shown at trace 80, the output of the first driver is shown at trace 81, the output of a second driver is shown at trace 82, and the sum of the outputs of the first and second drivers is shown at trace 83. As can be seen, according to the early enable turn off approach, a first driver turns on synchronized with the bus clock at point 85. The first device turns off at point 86 which is prior to the rising edge of the bus clock. The second driver turns on at point 87 on the succeeding rising edge of the bus clock, after the first driver on trace 81 is allowed to settle to the high impedance state, as shown at trace 83, segment 88. During the interval between the early turn off at point 86 and the synchronized turn on at point 87, a bus holder circuit maintains the signal state on the bi-directional line. No high current spike from contention is caused when the second driver turns on, because the bus holder circuit is readily overcome by the power of the second driver and flips to the state driven by the second driver.

Figure 7:
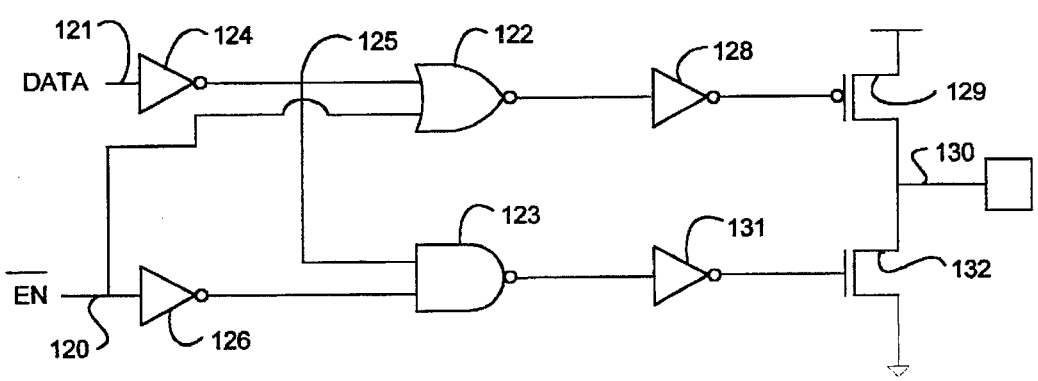
FIG. 7 is a logic diagram of a tri-state driver which may be used in the system of FIG. 3.

FIG. 7 illustrates the basic tri-state driver with an active low enable signal $\overline{EN}$ on line 120. The data input is supplied on line 121 in FIG. 7. The circuit includes a NOR gate 122 and a NAND gate 123. An inverter 124 receives the data signal on line 121 and supplies an inverted version of it on line 125 as inputs to the NOR gate 122 and to the NAND gate 123. The active low enable signal on line 120 is supplied directly to the NOR gate 122, and through inverter 126 as an input to the NAND gate 123. The output of NOR gate 122 drives inverter 128. The output of inverter 128 is connected to the gate of p-channel transistor 129, which has its source coupled to the supply voltage and its drain coupled to the I/O node 130. The output of NAND gate 123 drives inverter 131. The output of the inverter 131 is coupled to the gate of an n-channel transistor 132, which has its source coupled to ground and its drain connected to the I/O output on line 130.

When the active low enable signal on line 120 is high, the output of NOR gate 122 is low, and the output of inverter 128 is high, which turns off transistor 129. Also, the output of inverter 126 is low, the output of NAND gate 123 is therefore high, causing the output of inverter 131 to a low state which turns off transistor 132. Therefore, node 130 is in a high impedance state with both transistors 129 and 132 off. When the enable signal on line 120 goes low, the outputs of NOR gate 122 and of NAND gate 123 are controlled by the data signal on line 121. Thus, when the data signal is high, the output of inverter 124 is low, which causes the output of NOR gate 122 to be high, and the output of inverter 128 to be low, turning on transistor 129 and pulling up node 130. At the same time, the output of NAND gate 123 will be high, causing the output of inverter 131 to be low, keeping transistor 132 off. When the data input on line 121 is low, the opposite effect occurs, turning on transistor 132 and turning off transistor 129 to pull down node 130. The sizes of the transistors 129 and 132 are such that they have substantially more current drive than the bus holding circuit in the system according to the present invention.

Figure 8:
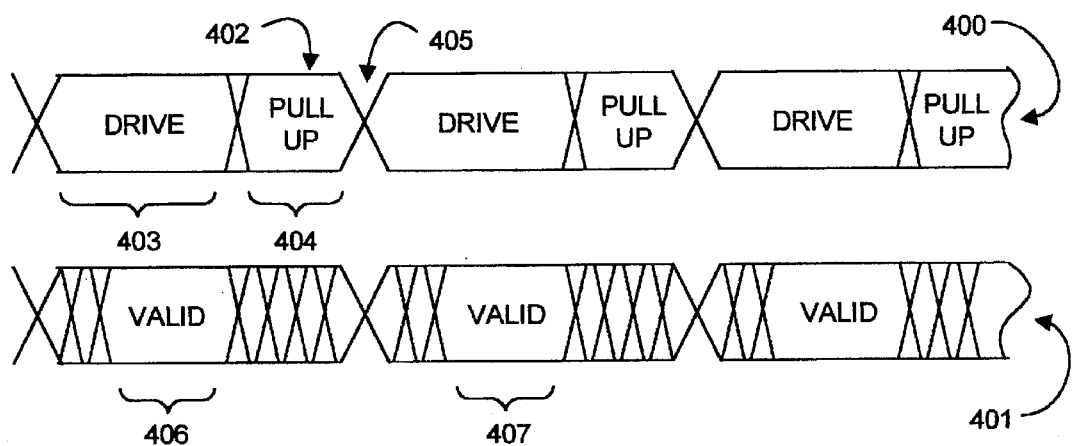
FIG. 8 shows bus timing for valid data in prior art systems.
Figure 9:
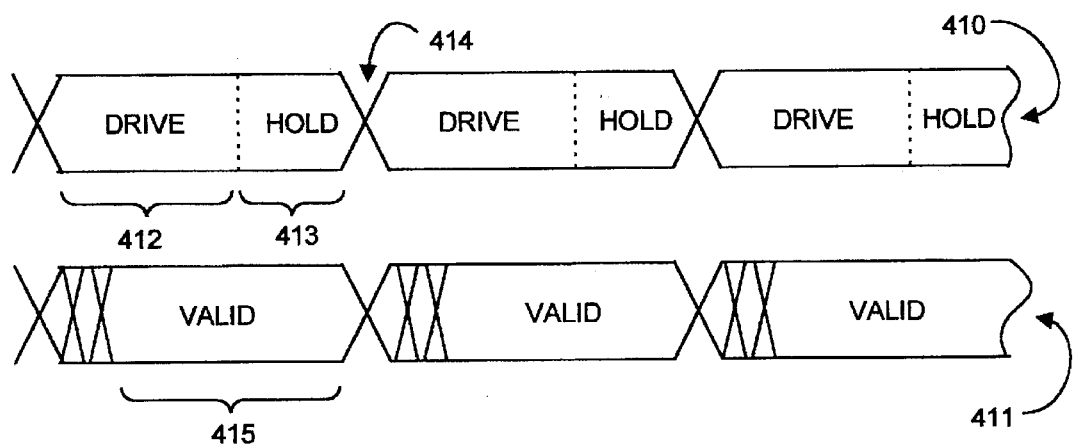
FIG. 9 illustrates bus timing for valid data according to the present invention.

FIGS. 8 and 9 illustrate the advantages of the present invention over the prior art. FIG. 8 shows the data valid timing in the typical prior art bus driving technique designed to avoid the current spike described above with reference to FIG. 4. Thus, the bus state is shown along trace 400 and the data valid state is shown along trace 401. For a first bus cycle 402, in the prior art, the drivers would be active during the region generally 403. Then, the drivers would stop driving and pull up circuitry would take over during the region 404. This would be followed by a bus transition at point 405. The next bus cycle will have the same configuration with a drive window, a pull up window, followed by a transition. The data valid state as illustrated along trace 401 in the figure would thus only be valid during the region 406 of the first bus cycle and the region 407 of the following bus cycle. A substantial part of the bus bandwidth is consumed by time in which no data is valid on the bus. It will be appreciated that these prior art systems thus do not make effective use of the available bus bandwidth.

FIG. 9 shows a dramatic improvement provided according to the present invention. According to the present invention, the bus state is shown along trace 410 and the bus valid state is shown along trace 411. Thus, during a first bus cycle, the driver is active in region 412 and the bus holder is active in region 413. Next, a transition occurs at point 414. The following bus cycles have similar characteristics with a drive window followed by a hold window and then a bus transition. The data on the bus is valid for each bus cycle during the time 415 for the first bus cycle. As can be seen, this is a substantially wider valid region than is provided in the prior art represented by FIG. 8. That is, the data remains valid throughout the holding window on the bus state. Only when the next bus cycle is driven does a transition occur and a brief period of invalid data happen.

Accordingly, a tri-state synchronous bus is provided which allows for cycle to cycle reversal of bi-directional lines on the bus. This greatly improves bus throughput and efficiency, and allows very high speed synchronous buses to be used even more effectively. The performance of the tri-state synchronous bus of the present invention is improved when implemented with the variable pulse width generating digital circuit, in accordance with the present invention.

FIG. 10 shows a portion of a computing environment, including an exemplary DRAM system environment in which the variable pulse signal generating circuit of the present invention is utilized. The DRAM system is coupled to the remainder of the computing environment via port 563, data bus 560, address bus 561, and channel control signal bus 562. The CAS signal on lines 570, 571 is generated in accordance with one embodiment of the variable pulse width signal generation circuit of the present invention.

The variable pulse generating digital circuit 550, in accordance with another embodiment of the present invention, is implemented in the Dynamic Memory Control application-specific integrated circuit (ASIC) 551. One embodiment of the circuit 550 is shown in FIG. 1 designated by reference numeral 250. In FIG. 10, the Dynamic Memory Control ASIC 551 controls the instruction memory 555 and the local data memory 554 of the central processing unit (CPU) 553. Byte, half word, or word writes can be supported by the Dynamic Memory Control ASIC 551. Instruction bus 572 is read only and is used to supply the CPU 553 with instructions. Data buses 560, 565, 566 are bidirectional and are used for reading and writing the instruction memory by the CPU 553, in conjunction with the Dynamic Memory Control ASIC 551 via the bus switch ASICs 552 and bus switch control line 569. Bus switch ASIC 552 and instruction memory 555 are coupled to each other via I/O bus 564.

The Dynamic Memory Control ASIC 551 provides various control signals to the instruction memory 555 and the local data memory 554 through lines 570 and 571, respectively. Thus, multiplexed addresses to support input/output operations, RAS, CAS, write enable, and output enable signals are some of these control signals. The present invention permits a feasible and cost-effective implementation of the variable pulse generating circuit in a single IC chip.

The foregoing description of a preferred embodiment of the invention has been presented for purposes of illustration and description. It is not intended to be exhaustive or to limit the invention to the precise forms disclosed. Obviously, many modifications and variations will be apparent to practitioners skilled in this art. It is intended that the scope of the invention be defined by the following claims and their equivalents.

What is claimed is:

1. A signal generating digital circuit, the circuit receiving a clock signal having clock edges including a first clock edge which is one of a rising edge and a falling edge and a second clock edge, which is one of a rising edge and a falling edge following the first clock edge without intervening clock edges, the clock signal having a clock period, comprising:

a signal modifier for generating a resulting signal at a first signal state in response to and synchronized with the first clock edge, the resulting signal transitioning from the first signal state to a second signal state in response to a toggle signal; and a delay means, responsive to the clock signal and a time delay, for generating the toggle signal, the resulting signal at the first signal state having a duration that is other than a multiple of a half of the clock period and has a transition to the second signal state between two clock edges of the clock sigal entering the delay means, wherein the duration of the resulting signal at the first signal state that is responsive to and synchronized with the first clock edge is greater than the time measured between the first clock edge and the second clock edge; and the delay means generates the toggle signal in response to and synchronized with the second clock edge and the time delay is measured from the second clock edge.

2. The digital circuit of claim 1, wherein the first state corresponds to a logic 0 and the second state corresponds to a logic 1.

3. The digital circuit of claim 1, wherein the first state corresponds to a logic 1 and the second state corresponds to a logic 0.

4. The digital circuit of claim 2; wherein the signal modifier includes:

a first enable means for receiving the clock signal and a first reset signal, the first reset signal having a first enabled state and a first disabled state, and for generating a first intermediate signal having one of the first signal state and the second signal state when the first reset signal is in the first disabled state;

a second enable means for receiving the clock signal and a second reset signal, the second reset signal having a second enabled state and a second disabled state, and for generating a second intermediate signal having one of the first signal state and the second signal state when the second reset signal is in the second disabled state; and means, responsive to the first intermediate signal and the second intermediate signal, for generating the resulting signal.

5. The digital circuit of claim 4, wherein the toggle signal controls the first reset signal and the second reset signal to enable and disable the first enable means and the second enable means.

6. The digital circuit of claim 5, wherein the toggle signal includes a transition between a first toggle state and a second toggle state.

7. The digital circuit of claim 4, wherein the first enable means includes:

a first flip-flop, including,
   a first data input for receiving a data valid signal,
   a first clock input for receiving the clock signal,
   a first reset input for receiving the first reset signal, and
   a first output for generating the first intermediate signal; and a first NOR gate, including,
   a plurality of inputs for receiving a test reset signal and the toggle signal, and
   a first NOR output for supplying the first reset signal to the first reset input of the first flip-flop.

8. The digital circuit of claim 7, wherein the second enable means includes:

a second flip-flop, including,
   a second data input for receiving the data valid signal,
   a second clock input for receiving the clock signal,
   a second reset input for receiving the second reset signal, and
   a second output for generating the second intermediate signal; and a second NOR gate, including,
   a plurality of inputs for receiving a test reset signal and the toggle signal, and
   a second NOR output for supplying the second reset signal to the second reset input of the second flip-flop.

9. The digital circuit of claim 8, wherein the means for generating the resulting signal includes a NOR gate for receiving the first intermediate signal and the second intermediate signal and for generating the resulting signal.

10. The digital circuit of claim 9, wherein the delay means includes:

a third NOR gate for receiving the second reset signal and the resulting signal and for generating a toggle control signal;

a delay buffer for receiving the clock signal and for supplying a toggle clock signal; and a third flip-flop for receiving the toggle control signal and the toggle dock signal and for supplying the toggle signal to the first enable means and the second enable means.

11. The digital circuit of claim 1, wherein the signal is an output enable signal for an output enable circuit in a tri-state synchronous bus driver.

12. The digital circuit of claim 1, wherein the signal is a CAS signal for a column access strobe (CAS) generating circuit for a dynamic random access memory (DRAM) computing environment.

13. A signal generating digital circuit, the circuit receiving a clock signal having clock edges including a first clock edge which is one of a rising edge and a falling edge and a second clock edge which is one of a rising edge and a falling edge, the clock signal having a clock period, comprising:

a signal modifier for generating a resulting signal at a first signal state in response to and synchronized with the first clock edge, the resulting signal transitioning from the first signal state to a second signal state in response to a toggle signal, wherein the signal modifier includes, a first enable means for receiving the clock signal and a first reset signal, the first reset signal having a first enabled state and a first disabled state, and for generating a first intermediate signal having one of the first signal state and the second signal state when the first reset signal is in the first disabled state, a second enable means for receiving the clock signal and a second reset signal, the second reset signal having a second enabled state and a second disabled state, and for generating a second intermediate signal having one of the first signal state and the second signal state when the second reset signal is in the second disabled state, and means, responsive to the first intermediate signal and the second intermediate signal, for generating the resulting signal; and a delay means, responsive to the second clock edge of the clock signal and a time delay, for generating the toggle signal, the resulting signal at the first signal state having a duration that is other than a multiple of a half of the clock period and has a transition to the second signal state between two clock edges of the clock signal entering the delay means.

14. The digital circuit of claim 13, wherein the toggle signal controls the first reset signal and the second reset signal to enable and disable the first enable means and the second enable means.

15. The digital circuit of claim 14, wherein the toggle signal includes a transition between a first toggle state and a second toggle state.

16. The digital circuit of claim 13, wherein the first enable means includes:

a first flip-flop, including,
   a first data input for receiving a data valid signal,
   a first clock input for receiving the clock signal,
   a first reset input for receiving the first reset signal, and
   a first output for generating the first intermediate signal; and a first NOR gate, including,
   a plurality of inputs for receiving a test reset signal and the toggle signal, and
   a first NOR output for supplying the first reset signal to the first reset input of the first flip-flop.

17. The digital circuit of claim 16; wherein the second enable means includes:

a second flip-flop, including,
   a second data input for receiving the data valid signal,
   a second clock input for receiving the clock signal,
   a second reset input for receiving the second reset signal, and
   a second output for generating the second intermediate signal; and a second NOR gate, including,
   a plurality of inputs for receiving a test reset signal and the toggle signal, and
   a second NOR output for supplying the second reset signal to the second reset input of the second flip-flop.

18. The digital circuit of claim 17, wherein the means for generating the resulting signal, includes a NOR gate for receiving the first intermediate signal and the second intermediate signal and for generating the resulting signal.

19. The digital circuit of claim 18, wherein the delay means includes:

a third NOR gate for receiving the second reset signal and the resulting signal and for generating a toggle control signal;

a delay buffer for receiving the clock signal and for supplying a toggle clock signal; and a third flip-flop for receiving the toggle control signal and the toggle clock signal and for supplying the toggle signal to the first enable means and the second enable means.

20. A method of generating a resulting signal in response to a clock signal having clock edges including a first clock edge which is one of a rising edge and a falling edge and a second clock edge which is one of a rising edge and a falling edge following the first clock edge without intervening clock edges, the clock signal having a clock period, comprising steps:

forming the resulting signal at a first signal state in response to and synchronized with the first clock edge of the clock signal;

forming a toggle signal in response to a time delay and the second clock edge; and forming a transition of the resulting signal from the first signal state to a second signal state in response to the toggle signal, the first signal state having a duration that is other than a multiple of a half of the clock period and has a transition to the second signal state between two clock edges of the clock signal.

21. The method of claim 20, wherein the step of forming the resulting signal at the first signal state includes:

forming a first reset signal, the first reset signal having an enabled state and a disabled state; and forming a first intermediate signal having one of the first signal state and the second signal state when the first reset signal is in the disabled state to trigger the formation of the resulting signal.

22. The method of claim 21, wherein the step of forming the transision of the resulting signal to the second signal state includes:

forming a second reset signal having an enabled state and a disabled state; and forming a second intermediate signal having one of the first signal state and the second signal state when the second reset signal is in the disabled state to trigger the formation of the resulting signal.

* * * * *